United States Patent [19]
Page

[11] 3,847,299
[45] Nov. 12, 1974

[54] APPARATUS FOR MAKING COMPOST

[76] Inventor: Arthur Lewis John Page, "St Peter" Walton Hill, Deerhurst, Gloucester, England

[22] Filed: Oct. 13, 1972

[21] Appl. No.: 297,295

[30] Foreign Application Priority Data
Oct. 14, 1971 Great Britain.................... 47898/71
Apr. 19, 1972 Great Britain.................... 18142/72

[52] U.S. Cl. ........ 220/4 F, 229/23 R, 229/DIG. 14, 229/41 R, 229/43, 217/12 R, 23/259.1, 220/DIG. 27

[51] Int. Cl. ........................................... B65d 25/18

[58] Field of Search .................. 23/259.1; 206/46 F; 229/DIG. 14, 23, 41 R, 43; 220/DIG. 27, 9 F, 93, 4 F; 217/12 R, 13

[56] References Cited
UNITED STATES PATENTS

| | | | |
|---|---|---|---|
| 960,028 | 5/1910 | Low..................................... | 220/93 |
| 1,952,817 | 3/1934 | Neary................................ | 217/12 R |
| 1,988,091 | 1/1935 | Schumacher................ | 229/DIG. 14 |
| 2,533,773 | 12/1950 | DeLaForet......................... | 229/6 A |
| 2,954,285 | 9/1960 | Carlsson et al.................... | 23/259.1 |
| 3,335,846 | 8/1967 | Mills.................................... | 220/9 F |

*Primary Examiner*—Herbert F. Ross
*Assistant Examiner*—Douglas B. Farrow
*Attorney, Agent, or Firm*—Young & Thompson

[57] ABSTRACT

A box for use in making compost comprises interlocking side wall sections of a material, such as expanded polystyrene, having a low thermal conductivity. The box has two lids, namely an inner lid which fits within the side walls to engage and compact the compost and a lid proper which fits on the side walls. Grooves are formed in the inner faces of the wall sections and in the lower face of the inner lid, the grooves communicating with through holes to permit controlled air circulation.

5 Claims, 5 Drawing Figures

APPARATUS FOR MAKING COMPOST

This invention relates to apparatus for use in making compost.

Traditionally, compost is made by forming a heap of vegetable matter (such as grass, weeds, flowers and kitchen refuse) and leaving the vegetable matter to rot to form compost. There are various techniques for facilitating composting; some involve the inclusion of layers of soil and the sprinkling of chemical accelerators and lime.

The compost forms in two stages, in the first of which air has to reach the matter to be composted and it is desirable that considerable heat is evolved whereby the vegetable matter attains a sufficiently high temperature for grass and weed seeds to be destroyed. However, it is has often been found that insufficient heating is obtained and that said seeds are not destroyed. In the second stage, neither air nor heat is necessary and maturing of the compost is assisted by worms and other organisms.

The method of composting as at present practised is unsatisfactory when carried out on a small scale, as in the average-sized private garden, because the amount of vegetable matter available only produces a small heap of which the total area of the top and sides is large compared with its volume. This means that an undesirably large amount of the heat generated in the first stage escapes and the heap does not reach the temperature at which the micro-organisms can work most effectively and at which weed and grass seeds are destroyed. Another unsatisfactory feature of the traditional compost heap is that it may take up to a year to mature and thus occupies ground for long periods during which it can become untidy, start sprouting, dry out and have its nutriments leached out by rain.

According to the invention composting apparatus comprises a plurality of sections which can be assembled to form a box, the sections being thermal insulators and grooves being formed in the inner faces of the sections in communication with through holes. Thus, when the box is assembled and contains decaying vegetable matter, air can gain access to the interior of the box and be distributed throughout the vegetable matter without excessive loss of heat from within the box. The rate of composting is thus increased.

The box may have a pair of lids, an inner lid resting on top of the vegetable matter within the box and the other lid cooperating with the side walls of the box so as to prevent, or substantially prevent, the entry of rain into the interior of the box whilst permitting the circulation of a regulated amount of air. The sections forming the walls of the box and the lids may be made as single moulded bodies or may be made of layers of a material having a low coefficient of conductivity sandwiched between two layers or sheets of a rigid material, for example, non-expanded synthetic plastics material.

By the sections being thermal insulators is meant that they have a thermal conductivity of less than 1 mW/cm°C, e.g. expanded polystyrene having a coefficient of thermal conductivity of 0.33 mW/cm°C. The inner lid may also be formed fo foamed polystyrene having this thermal conductivity.

The grooves formed on the inner faces of the sections are preferably semi-cylindrical grooves having a diameter of, for example, approximately 0.2 inches, the sections being approximately 1 inch in thickness. The through holes which communicate with the grooves are preferably of frusto-conical form having a diameter at the inner end thereof approximately 0.3 inches and a diameter at the outer end thereof of approximately 0.2 inches.

The invention will now be described with reference to an embodiment thereof illustrated in the accompanying drawings. In the drawings.

Figure 2A:
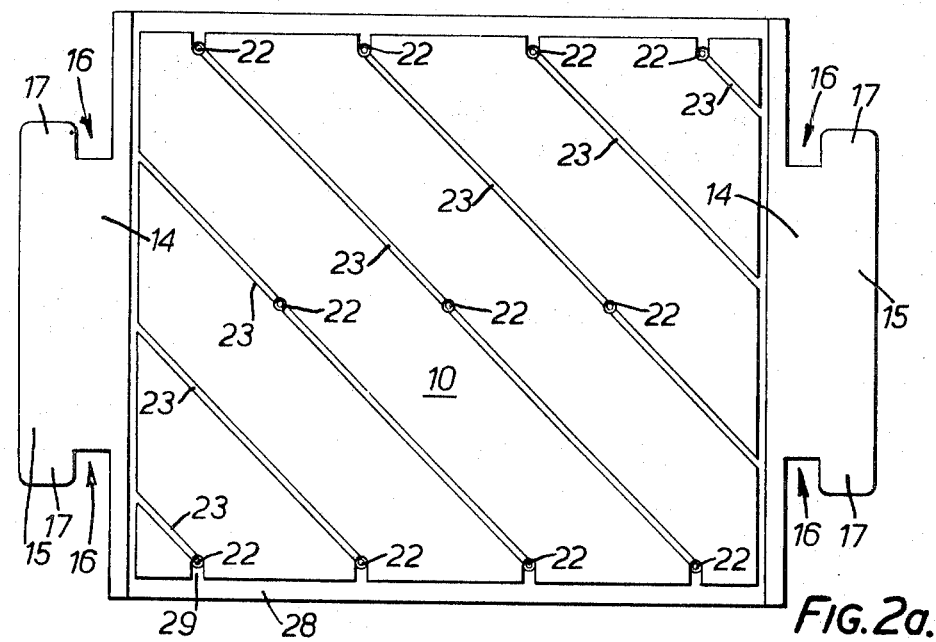
FIGS. 2a and 2b are inner side views of components of the apparatus, each component forming part of a wall thereof.
Figure 2B:
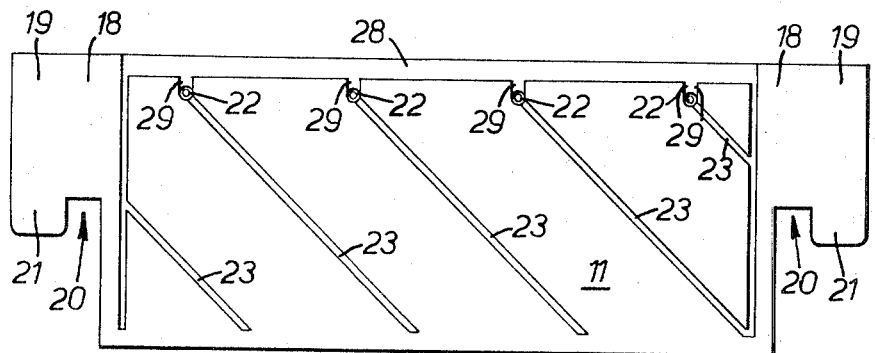
Figure 3:
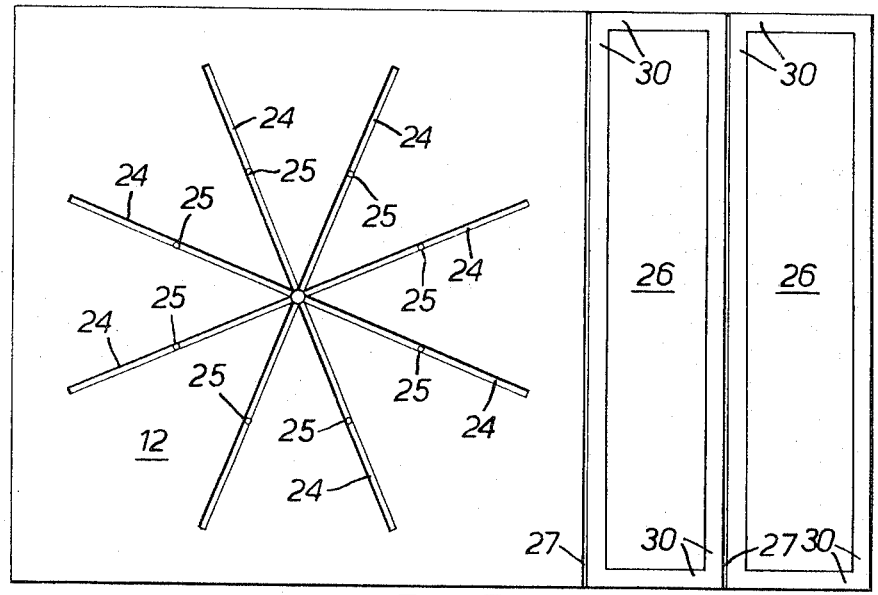
FIG. 3 is an inner side view of a plastics moulding from which an inner lid is formed.

As shown in the drawings, an apparatus which can be assembled to form a box for making compost comprises four sections 10 of the configuration shown in FIG. 2a and four sections 11 of the configuration shown in FIG. 2b. The numbers of the sections which are used depend on the required height of the walls of the box. The box also includes an inner lid 12, as shown in FIG. 3, and an outer lid 13. Each section and lid is approximately 1 inch in thickness and of expanded polystyrene, the degree of foaming being such that the thermal conductivities of the sections 10 and 11 and of the inner lid 12 are approximately 0.33 mW/cm°C whereas the outer lid 13 is foamed to a lesser extent to obtain increased mechanical strength.

The section 10 shown in FIG. 2a is of generally rectangular shape and at opposite vertical edges the section has a spacer portion 14 and an end portion 15. The portions 14 and 15 together define a pair of notches 16 whose widths are the same as the thickness of the section and a pair of lugs 17. The section 11 shown in FIG. 2b is half the height of section 10 and at each end it has a spacer portion 18 and an end portion 19 which together define a notch 20 and a lug 21. Each section 10 is provided with three horizontal rows of through holes 22 whereas each section 11 has one horizontal row of through holes 22. The holes 22 are of frusto-conical form, the larger diameter ends thereof being at the outer surface of the section. The holes 22 can be 0.3 inches in diameter at their larger ends and 0.2 inches in diameter at their smaller ends. This frusto-conical formation of the holes 22 permits the required ventilation to be obtained without causing excessive localised cooling of the decaying vegetable matter.

The through holes 22 communicate with elongated grooves 23 in the inner faces of the wall sections 10 and 11, the grooves 23 being inclined at 45° to the vertical to give access to as much as possible of the vegetable matter, it being remembered that the height of the pile of decaying vegetable matter will progressively decrease during the composting process and that, accordingly, different portions of the pile will be located adjacent the grooves 23 at different times. The grooves 23 are of semicircular cross-section and 0.2 inches in diameter. The inner lid 12 is formed on its undersurface with diagonal grooves 23 and with through holes 25, one for each groove 24. The inner lid 12 is a loose fit within the box and is placed on top of the pile, preferably with a brick on top of the lid, so as to limit dissipation of heat from the upper surface of the pile of decaying vegetable matter, to compact the pile and to prevent the formation of a "cold zone" in contact with said upper surface.

The inner lid 12 may be moulded in one piece with a pair of elongated sections 26 which are connected to each other and to the lid 12 by rupturable webs 27. The sections 26 may be placed either beneath the pile of decaying vegetable matter to provide for increased ventilation of the lowermost portion of the pile and insulation thereof from the ground or on top of the pipe beneath the inner lid 12 to provide a ventilated air space adjacent the top of the pile.

The side wall sections 10 and 11 can be rebated as at 28 along their lower edges, the rebates 28 having a depth of 0.125 inches. The rebates 28 communicate with vertical grooves 29 of approximately 0.3 inches in width and 0.5 inches in height. The vertical grooves 29 communicate with the through holes 22 and thus provision is made for the access of air around the whole of the lowermost portion of the pile of vegetable matter. The sections 26 have their peripheries formed with triangular cross-section rebates 30 so that, when sections 26 are placed beneath the pile, the rebates 30 can be placed in communication with the rebates 28 to provide for increased ventilation of the base of the pile.

Figure 4:
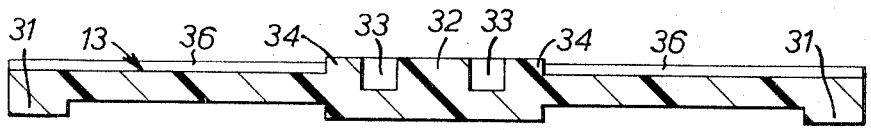
FIG. 4 is a sectional view of an outer lid or cover of the apparatus.

The outer lid 13, shown in FIG. 4 of the drawings, is of rectangular form in plan view and has a peripheral portion of increased thickness as compared with the major portion thereof. This increased thickness portion effectively provides end ribs 31 which fit over the upper edges of a pair of opposed walls of the box, the dimensions of the lid being such that a small gap is left between each longitudinal edge thereof at which upstanding ribs 36 are provided and the adjacent side wall to allow limited circulation of air to and from the interior of the box. The lid 13 is provided with a central circular projecting portion 32 surrounded by an annular rebate 33 and an upstanding rib 34, said portion 32 effectively providing a knob to facilitate handling of the lid. An alternative lid formation may be provided with the lid having shaped projections on its undersurface for engagement with the upper portions of the side walls to locate the lid in a plurality of positions relative to the side walls to give controlled yet variable ventilation.

Although the components of the box are preferably moulded from foamed polystyrene, other materials may be used, for example, the side wall sections may each be of a sandwich construction comprising inner and outer skins of polyvinylchloride or polypropylene with an insulating layer or an air space between the skins. Alternatively, each component of the apparatus may be formed in two parts, namely an inner part of foamed polystyrene and an outer part which acts as a reinforcement of back member and is of polyvinylchloride or polypropylene.

In use, the box is assembled to any height required using the appropriate number of sections 10 and 11 and the box is filled with vegetable matter to a height of approximately 4 inches from the top, the inner lid 12 is fitted loosely within the sides of the box and the outer lid 13 placed in position. The vegetable matter then rots to form compost. Heat losses through the sides and the lids of the box are very low so that the temperature within the box rises to a sufficiently high value to destroy grass and weed seeds. The vegetable matter compacts and further vegetable matter can be added from time to time.

Figure 1:
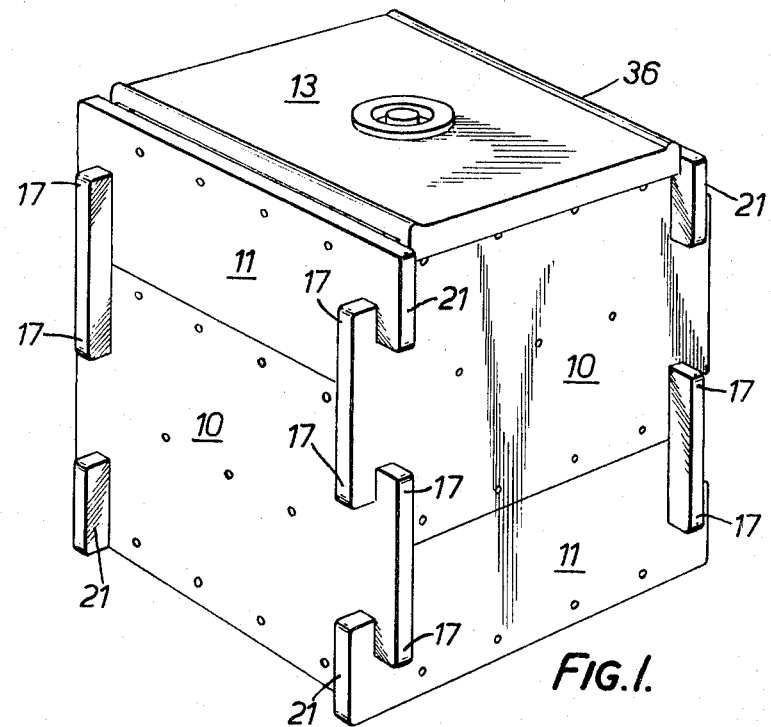
FIG. 1 is a perspective view of apparatus for making compost.

A test has been carried out using a box as shown in FIG. 1 of the drawings. The box was filled with vegetable matter consisting of damp straw, freshly cut grass, green kitchen refuse, dry straw and weeds. A thermometer was placed six inches below the surface of the vegetable matter in the box and, for comparison purposes, a traditional compost heap was made having a base area approximately twice that of the box and a height substantially equal to the height of the pile of vegetable matter within the box, the heap being made with the same kind of vegetable matter as that used to fill the box. A thermometer was placed in the heap, 6 inches below the surface thereof. The temperature in the box and in the heap was measured up to three times a day for 20 days, further vegetable matter being added periodically to the box. At the same time an equivalent thickness of vegetable matter was added to the heap. The box produced first stage compost in eighteen days and the table shows that it reached a temperature of 107°F (46°F above the air temperature at the time), whereas the traditional heap did not reach its maximum of 87°F (13°F above the air temperature) until fifteen days after the heap was made. A traditional heap of the same base area as the box would have taken even longer to heat up.

TABLE

| Day | Action Taken in respect of the box | | Temperature °F (taken each evening) | | |
|---|---|---|---|---|---|
| | | | Box | Heap | Outside |
| 1 | Filled to depth of 17" | | 64 | 64 | 64 |
| 2 | filled 7" | (to top of box) | 97 | 64 | 63 |
| 2 | | | | | |
| 3 | filled 2" | ( do. ) | | | |
| 3 | | | 107 | 69 | 61 |
| 4 | | | 105 | 64 | 62 |
| 5 | | | 110 | 66 | 68 |
| 6 | filled 1" | | | | |
| 6 | | | 108 | 81 | 62 |
| 7 | | | 108 | 80 | 66 |
| 8 | filled 6" | | | | |
| 8 | | | 99 | 85 | 61 |
| 9 | | | 108 | 84 | 58 |
| 10 | | | 109 | 80 | 57 |
| 11 | | | 109 | 75 | 63 |
| 12 | | | 108 | 71 | 57 |
| 14 | | | 91 | 75 | 60 |
| 15 | | | 90 | 79 | 62 |
| 16 | | | 92 | 87 | 64 |
| 18 | | | 80 | 85 | 60 |
| 19 | | | 74 | 79 | 55 |
| 20 | | | 70 | 77 | 57 |

(in box total depth of vegetable matter added: 33"
depth of compost remaining 13.75"
equals reduction of 58%)

I claim:

1. Composting apparatus comprising a plurality of sections which can be assembled to form a box, the sections being thermal insulators and grooves being formed in the inner faces of the sections in communication with through holes, said box being provided with a pair of lids, namely an inner lid which fits loosely within the side walls of the box and an outer lid which substantially closes the top of the box.

2. Composting apparatus according to claim 1, wherein said inner lid is of generally square form and is formed on its inner face with a plurality of intersecting grooves.

3. Composting apparatus comprising a plurality of sections which can be assembled to form a box, the sections being thermal insulators which are provided with through holes of frusto-conical form and grooves of semi-cylindrical form in the inner faces of the sections in communication with said through holes, said grooves being inclined to the vertical.

4. Composting apparatus according to claim 3, wherein the grooves are inclined at approximately 45° to the vertical and the sections comprise a first series of identical sections and a second series, which are also identical and which have a vertical dimension twice that of a section of the first series.

5. Composting apparatus comprising a plurality of sections of thermal insulating material which can be assembled to form a box, the sections being of rectangular form and including a first series which have generally T-shaped end formations and a second series which have generally L-shaped end formations, the sections of the second series having a vertical dimension half that of the first series and the T-shaped and L-shaped end formations being adapted to interlock to hold the sections in the assembled condition, said sections being formed with through holes for ventilation purposes.

* * * * *